(12) United States Patent
Fujimoto

(10) Patent No.: US 9,376,919 B2
(45) Date of Patent: Jun. 28, 2016

(54) TURBINE BLADE AND ENGINE COMPONENT

(75) Inventor: Shu Fujimoto, Tokyo (JP)

(73) Assignee: IHI Corporation, Tokyo (JP)

( * ) Notice: Subject to any disclaimer, the term of this patent is extended or adjusted under 35 U.S.C. 154(b) by 736 days.

(21) Appl. No.: 13/808,641

(22) PCT Filed: Jul. 7, 2011

(86) PCT No.: PCT/JP2011/065580
§ 371 (c)(1),
(2), (4) Date: Jan. 7, 2013

(87) PCT Pub. No.: WO2012/005324
PCT Pub. Date: Jan. 12, 2012

(65) Prior Publication Data
US 2013/0108471 A1    May 2, 2013

(30) Foreign Application Priority Data
Jul. 9, 2010    (JP) .................................. 2010-156949

(51) Int. Cl.
*F01D 5/18*    (2006.01)
(52) U.S. Cl.
CPC ................ *F01D 5/182* (2013.01); *F01D 5/186* (2013.01); *F05D 2250/185* (2013.01); *Y02T 50/673* (2013.01); *Y02T 50/676* (2013.01)
(58) Field of Classification Search
CPC ....... F01D 5/182; F01D 5/186; Y02T 50/676; Y02T 50/673; F05D 2250/185
USPC ........................ 415/115; 416/97 R
See application file for complete search history.

(56) References Cited

U.S. PATENT DOCUMENTS

| | | | | |
|---|---|---|---|---|
| 4,676,719 A | * | 6/1987 | Auxier | B23K 26/383 415/115 |
| 4,738,588 A | * | 4/1988 | Field | F01D 5/186 415/115 |
| 4,773,593 A | * | 9/1988 | Auxier | F01D 5/184 239/127.3 |

(Continued)

FOREIGN PATENT DOCUMENTS

| | | |
|---|---|---|
| CN | 86108816 A | 7/1987 |
| CN | 86108817 A | 7/1987 |

(Continued)

OTHER PUBLICATIONS

Combined Chinese Office Action and Search Report issued May 6, 2014 in Patent Application No. 201180033360.6 (with English language translation).

(Continued)

*Primary Examiner* — Igor Kershteyn
*Assistant Examiner* — Aaron R Eastman
(74) *Attorney, Agent, or Firm* — Oblon, McClelland, Maier & Neustadt, L.L.P.

(57) ABSTRACT

A turbine blade that is used in a turbine of a gas turbine engine and cooled by cooling air, and includes a cooling channel that is formed within the turbine blade and in which the cooling air flows, plural bottomed recesses that are formed on a blade surface of the turbine blade and of which each downstream-side inner wall is inclined, and an ejection hole that is formed on each bottom of the plural bottomed recesses and communicates with the cooling channel to eject the cooling air. The ejection hole is formed so that a central line of the ejection hole extends along the downstream-side inner wall. The above turbine blade can improve cooling without reducing efficiency.

7 Claims, 6 Drawing Sheets

(56) References Cited

U.S. PATENT DOCUMENTS

| | | | |
|---|---|---|---|
| 5,419,681 A * | 5/1995 | Lee | F01D 5/186 415/115 |
| 5,813,836 A | 9/1998 | Starkweather | |
| 6,234,755 B1 | 5/2001 | Bunker et al. | |
| 6,435,815 B2 * | 8/2002 | Harvey | F01D 5/14 415/115 |
| 6,547,524 B2 | 4/2003 | Kohli et al. | |
| 6,629,817 B2 | 10/2003 | Shelton et al. | |
| 7,011,502 B2 * | 3/2006 | Lee | F01D 5/187 416/97 R |
| 7,270,514 B2 * | 9/2007 | Lee | B23P 6/007 416/92 |
| 2002/0172596 A1 * | 11/2002 | Kohli | F01D 5/186 416/1 |
| 2005/0129516 A1 * | 6/2005 | Rinck | F01D 5/16 416/97 R |

FOREIGN PATENT DOCUMENTS

| | | |
|---|---|---|
| EP | 2 009 239 A2 | 12/2008 |
| JP | 9 144504 | 6/1997 |
| JP | 2002-221005 A | 8/2002 |
| JP | 2002 364305 | 12/2002 |
| JP | 2003 41902 | 2/2003 |

OTHER PUBLICATIONS

International Search Report Issued Sep. 20, 2011 in PCT/JP11/65580 Filed Jul. 7, 2011.

Office Action issued Jan. 28, 2014 in Korean Patent Application No. 10-2013-7001551 (with English language translation).

Extended European Search Report issued Mar. 21, 2016 in Patent Application No. 11803658.1.

\* cited by examiner (a)

(b)

TURBINE BLADE AND ENGINE COMPONENT

TECHNICAL FIELD

The present invention relates to an engine component, especially to a turbine blade, used in a gas turbine engine such as an aircraft engine and an industrial gas turbine engine.

BACKGROUND ART

A turbine blade exposed to combustion gas (main-flow gas) during operation of a gas turbine engine is generally cooled by utilizing cooling air (portion of compressed air) extracted from a compressor or a fan of the gas turbine engine. In addition, recently, temperature of combustion gas increases along with increasing of gas turbine engine power, and thereby it is desired to improve cooling of a turbine blade. A Patent Document 1 listed below discloses an art for improving cooling of a turbine blade.

In an inside of the turbine blade disclosed in the Patent Document 1, a cooling channel in which cooling air (portion of compressed air) flows is formed. A bottomed slot extending along a span direction (a height direction of the blade) is formed on a blade surface of the turbine blade. In addition, plural ejection holes for ejecting the cooling air are formed on a bottom of the bottomed slot at intervals along the span direction. Each of the ejection holes communicates with the cooling channel.

During operation of the gas turbine engine, cooling air extracted from a compressor or a fan flows into the cooling channel, so that the turbine blade is cooled from its inside by a convective cooling (an internal cooling). In addition, the cooling air after convectively cooling the turbine blade is ejected from the plural ejection holes to form a cooling film surrounding the blade surface of the turbine blade, so that the turbine blade is cooled by a film cooling (an external cooling).

Here, the cooling air ejected from the ejection holes expands along the span direction in the bottomed slot and stays in the bottomed slot to absorb heat, and then goes out of the bottomed slot to form the cooling film extensively. As a result, cooling of the turbine blade is improved.

PRIOR ART DOCUMENT

Patent Document

Patent Document 1: U.S. Pat. No. 6,234,755

SUMMARY OF INVENTION

Technical Problem

In the turbine blade disclosed in the Patent Document 1, cooling of the turbine blade is improved, but the combustion gas strikes on a downstream-side inner wall of the bottomed slot when passing through the bottomed slot and is separated from the blade surface. Therefore, aerodynamic loss of the turbine blade increases, so that engine efficiency of the gas turbine engine reduces. Namely, cooling of the turbine blade is improved, but it is hard to sufficiently restrict the reduction of engine efficiency.

Note that the same problem similarly occurs also in an engine component cooled by cooling air, such as shroud, other than the turbine blade.

An object of the present invention is to provide a turbine blade and an engine component that can improve cooling without reducing efficiency.

Technical Solution

A first aspect of the present invention provides a turbine blade that is used in a turbine of a gas turbine engine and cooled by cooling air, and that includes: a cooling channel that is formed within the turbine blade and in which the cooling air flows; a plurality of bottomed recesses that is formed on a blade surface of the turbine blade and of which each downstream-side inner wall is inclined; and an ejection hole that is formed on each bottom of the plurality of bottomed recesses and communicates with the cooling channel to eject the cooling air, wherein the ejection hole is formed so that a central line of the ejection hole extends along the downstream-side inner wall.

Note that the turbine blade includes a turbine rotor blade and a turbine stator vane. In addition, the blade surface includes a leading edge, a trailing edge, a pressure surface, and a suction surface. Further, the bottomed recess includes a bottomed slot.

According to the first aspect, when the cooling air flows into the cooling channel during operation of the gas turbine engine, the turbine blade is cooled from its inside by a convective cooling (an internal cooling). In addition, the cooling air after the convective cooling is ejected from the plural ejection holes to form a cooling film surrounding the turbine blade. The turbine blade is cooled from its outside by a film cooling (an external cooling) with the cooling film.

Here, since each downstream-side inner wall of the bottomed recesses is inclined and the ejection hole is formed so that the central line of the ejection hole extends along the downstream-side inner wall, an ejection angle of the cooling air from the ejection hole can be made small without spoiling airfoil of the turbine blade. As a result, Coanda effect by the cooling air can be obtained sufficiently. In addition, since the downstream-side inner wall is inclined, striking of combustion gas on the downstream-side inner wall is mitigated and thereby separation of the combustion gas from the blade surface can be reduced. Therefore, aerodynamic loss of the turbine blade is made small while improving cooling of the turbine blade, so that reduction of efficiency can be restricted.

A second aspect of the present invention provides an engine component that is used in a gas turbine engine and cooled by cooling air, and that includes: a cooling channel that is formed within the engine component and in which the cooling air flows; a plurality of bottomed recesses that is formed on a surface of the engine component and of which each downstream-side inner wall is inclined; and an ejection hole that is formed on each bottom of the plurality of bottomed recesses and communicates with the cooling channel to eject the cooling air, wherein the ejection hole is formed so that a central line of the ejection hole extends along the downstream-side inner wall.

Note that the engine component includes a turbine blade (a turbine rotor blade and a turbine stator vane), a shroud, a combustor liner, and so on.

According to the second embodiment, when the cooling air flows into the cooling channel during operation of the gas turbine engine, the engine component is cooled from its inside by a convective cooling (an internal cooling). In addition, the cooling air after the convective cooling is ejected from the plural ejection holes to form a cooling film surrounding the engine component. The engine component is cooled from its outside by a film cooling (an external cooling) with the cooling film.

Here, since each downstream-side inner wall of the bottomed recesses is inclined and the ejection hole is formed so that the central line of the ejection hole extends along the downstream-side inner wall, an ejection angle of the cooling air from the ejection hole can be made small without spoiling an aerodynamic shape/a hydrodynamic shape of the engine component to the combustion gas flowing around the engine component. As a result, Coanda effect by the cooling air can be obtained sufficiently. In addition, since the downstream-side inner wall is inclined, striking of combustion gas on the downstream-side inner wall is mitigated and thereby separation of the combustion gas from a surface of the engine component can be reduced. Therefore, aerodynamic loss of the turbine blade is made small while improving cooling of the turbine blade, so that reduction of efficiency can be restricted.

DESCRIPTION OF EMBODIMENTS

First Embodiment

Figure 1:
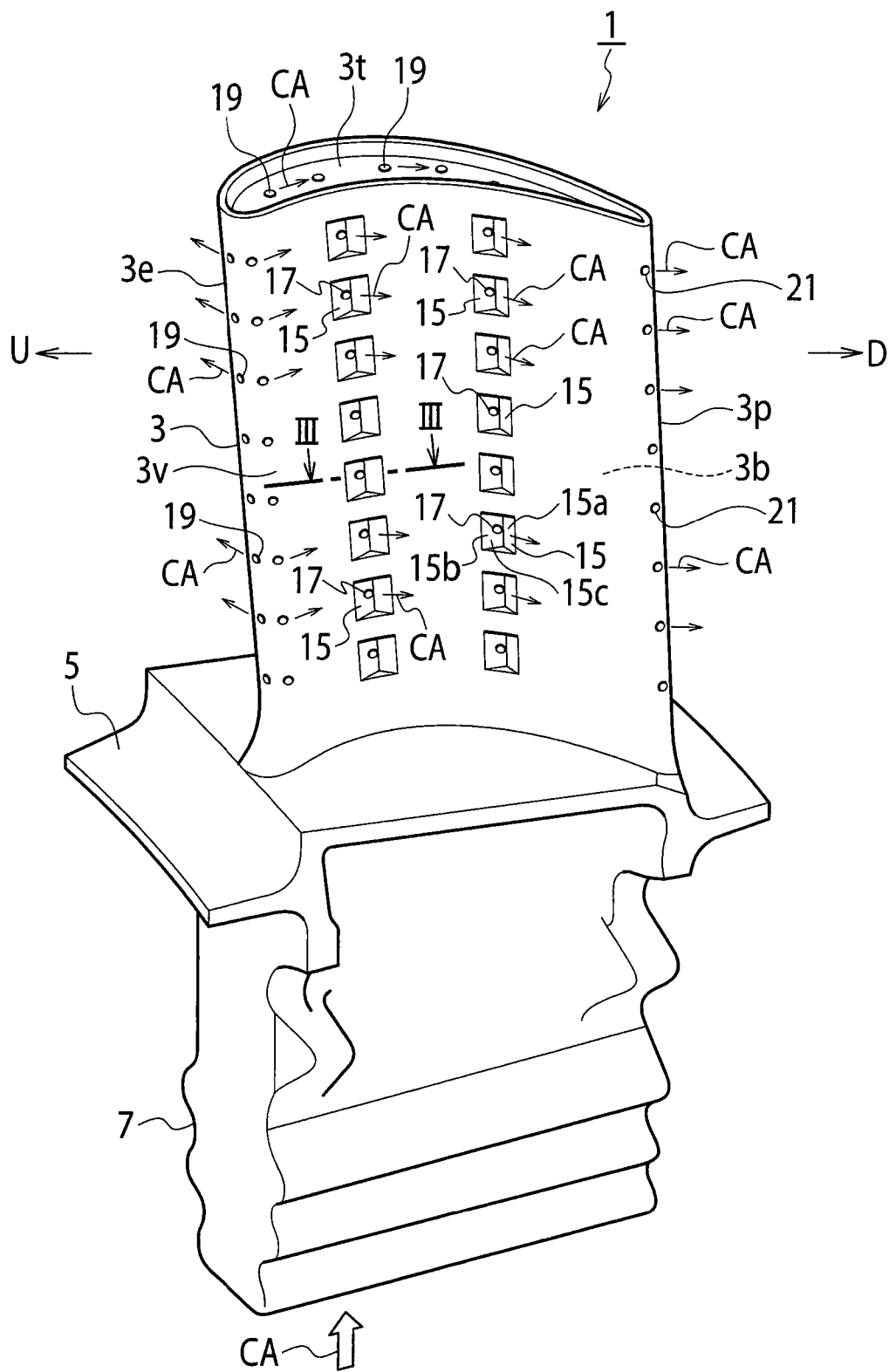
FIG. 1 is a perspective view of a turbine rotor blade according to a first embodiment.

A first embodiment will be explained with reference to FIGS. 1 to 4. Note that "D" in the drawings indicates a downstream direction of combustion gas, and "U" indicates an upstream direction.

Figure 2:
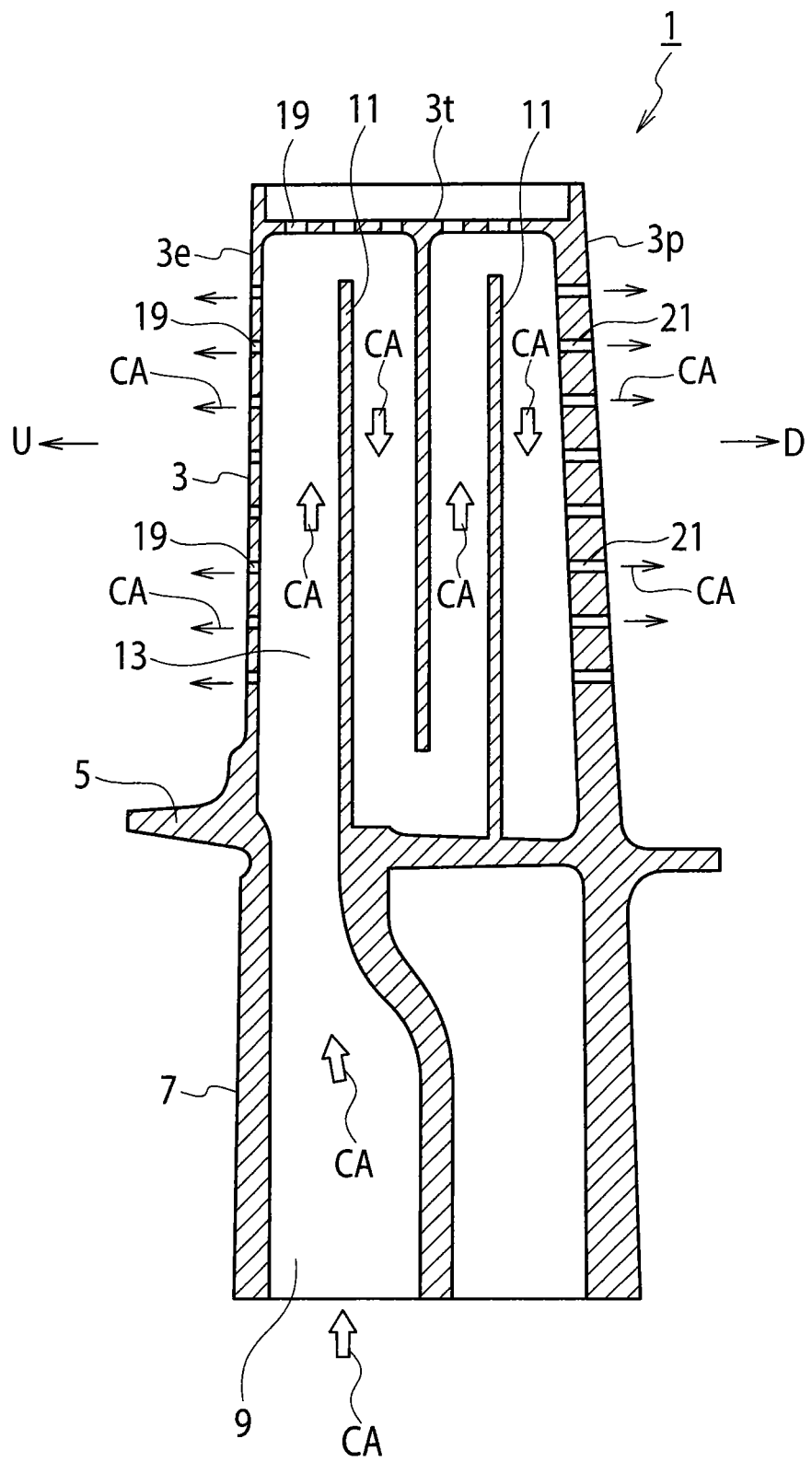
FIG. 2 is a longitudinal cross-sectional view of the turbine rotor blade along its span direction.
Figure 3:
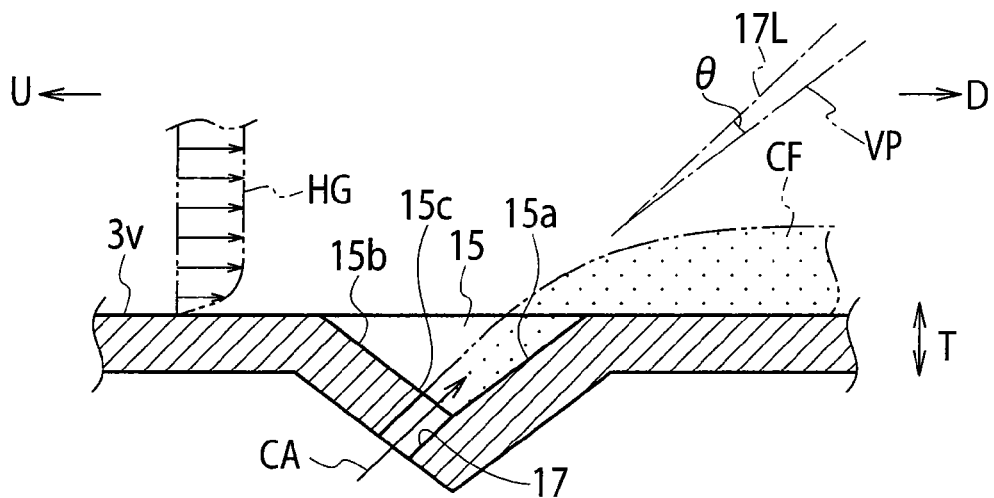
FIG. 3(a) is a cross-sectional view taken along a line shown in FIG. 1.
FIGS. 3(b) and 3(c) is cross-sectional views showing modified shape examples of a bottomed recess shown in FIG. 3(a).
Figure 3:
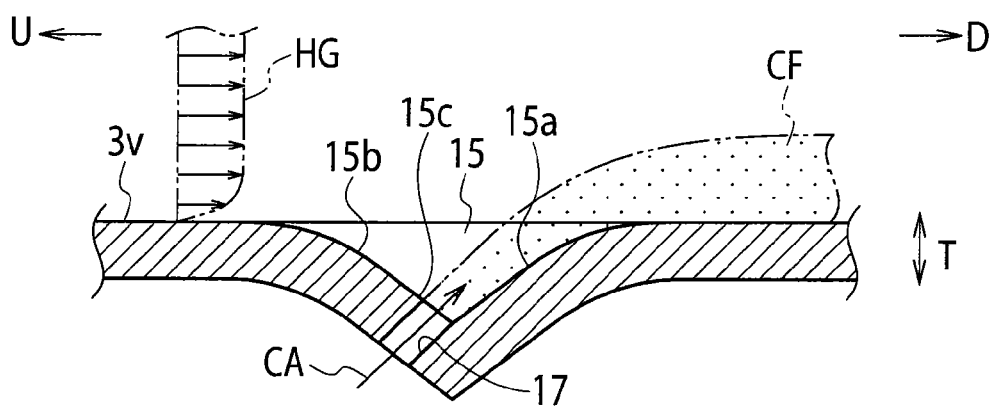
Figure 3:
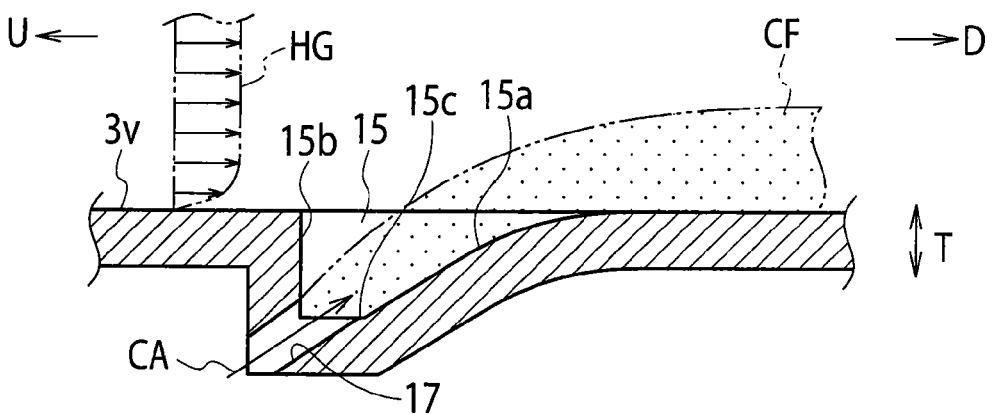
Figure 4:
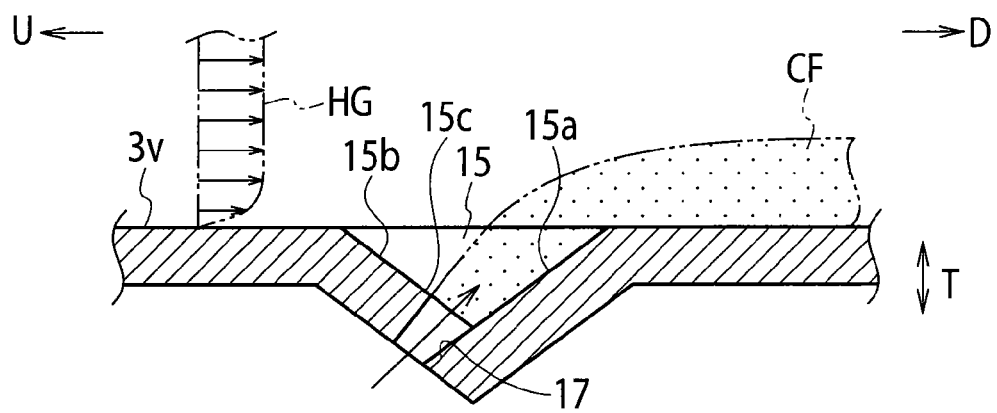
FIG. 4(a) is a cross-sectional view showing a modified shape example of an ejection hole.
FIG. 4(b) is a plan view showing the modified shape example of an ejection hole.
Figure 4:
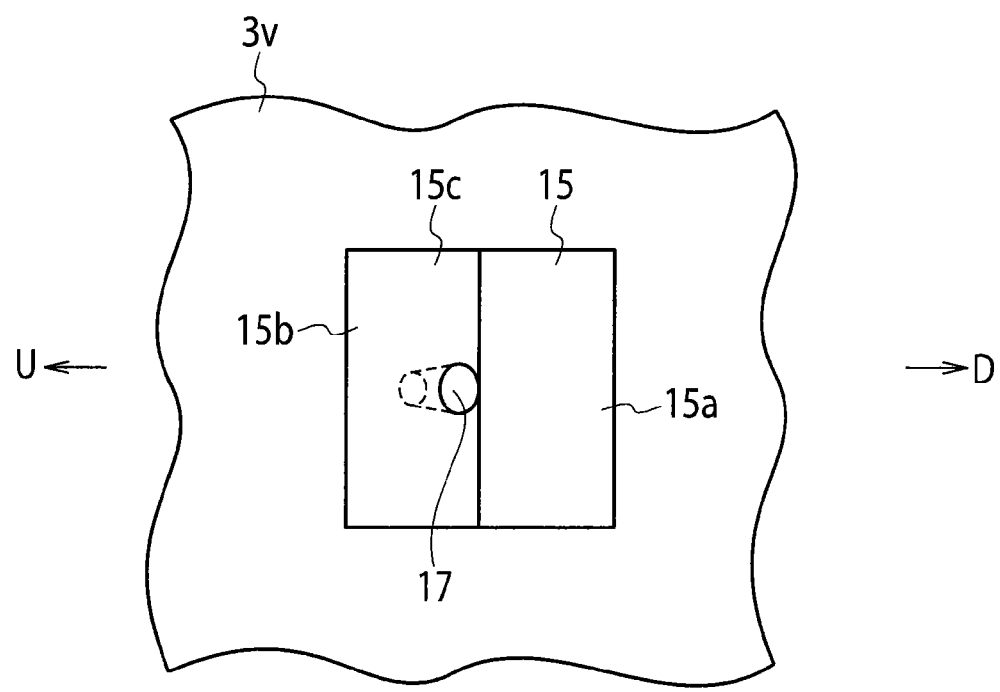

A turbine rotor blade 1 according to the present embodiment is used in a turbine (not shown) of a gas turbine engine such as an aircraft engine and an industrial gas turbine engine. As shown in FIGS. 1 and 2, the turbine rotor blade 1 is cooled by utilizing cooling air (portion of compressed air) CA extracted from a compressor (not shown) or a fan (not shown) of the gas turbine engine.

The turbine rotor blade 1 is made by lost wax precision casting, and includes a rotor blade body 3 that obtains a rotational force from combustion gas HG (see FIG. 3) from a combustor (not shown) of the gas turbine engine. In addition, a platform 5 is integrally formed at a base end of the rotor blade body 3. A dovetail 7 is integrally formed on the platform 5. The dovetail 7 is engaged with one of joint slots (not shown) formed around a turbine disc (not shown).

As shown in FIG. 2, an introduction channel 9 into which the extracted cooling air CA is introduced is formed in an inside from the dovetail 7 to the platform 5. In addition, plural partitions 11 extending along a span direction (a direction from the platform 5 to an end face 3t of the rotor blade body 3) are formed in an inside of the rotor blade body 3. A serpentine cooling channel 13 in which the cooling air CA flows is partitioned by the partitions 11. Namely, the serpentine cooling channel 13 is formed in an inside of the rotor blade body 3, and communicates with the introduction channel 9.

As shown in FIG. 1, plural bottomed recesses 15 are formed on a pressure surface 3v of the rotor blade body 3. In the present embodiment, the bottomed recesses 15 are aligned in plural rows in a chord direction (a direction from a leading edge 3e to a trailing edge 3p of the rotor blade body 3), and each of the rows includes plural bottomed recesses 15. In addition, as shown in FIG. 3(a), each downstream-side inner wall 15a of the bottomed recesses 15 is inclined (inclined to a thickness direction T of the rotor blade body 3: inclined to a flow direction of the combustion gas: an angle between the downstream-side inner wall 15a and the pressure surface 3v is obtuse), and each upstream-side inner wall 15b of the bottomed recesses 15 is also inclined symmetrically (inclined to the thickness direction T: inclined to the flow direction of the combustion gas: an angle between the upstream-side inner wall 15b and the pressure surface 3v is obtuse). Separated swirls can be made small by the inclination of the upstream-side inner wall 15b when separations occur at the bottomed recesses 15, so that aerodynamic loss can be made small.

Note that at least one of an end edge of the downstream-side inner wall 15a and an end edge of the upstream-side inner wall 15b may be formed as a smoothly curved surface as shown in FIG. 3(b). Alternatively, the upstream-side inner wall 15b may not be inclined but formed perpendicularly (parallel to the thickness direction T: perpendicular to the flow direction of the combustion gas: an angle between the upstream-side inner wall 15b and the pressure surface 3v is orthogonal) as shown in FIG. 3(c). In this case, separations that may occur at the bottomed recesses 15 can be delayed (separation positions are shifted downstream), so that aerodynamic loss can be made smaller.

As shown in FIG. 3(a) [similarly also in the modified examples in FIGS. 3(b) and 3(c)], ejection holes (film-cooling holes) 17 each having a circular shape are formed on each bottom 15c (including a bottom-side of the upstream-side inner wall 15b) of the bottomed recesses 15, and communicate with the cooling channel 13. Each of the ejection holes 17 is formed so that a central line 17L of the ejection hole 17 extends almost along the downstream-side inner wall 15a. Here, an inclined angle φ of the central line 17L to a plane (virtual plane) VP parallel to the downstream-side inner wall 15a of the bottomed recess 15 is set to equal-to or smaller-than ±20 degrees (−20 to +20 degrees). If the inclined angle φ is out of the range of ±20 degrees, Coanda effect by the cooling air CA ejected from the ejection holes 17 cannot be obtained sufficiently.

Note that a shape of the ejection hole 17 may be another shape such as an ellipsoidal shape and a rectangular shape. In addition, as shown in FIGS. 4(a) and 4(b), it is preferable that a shape of the ejection hole 17 is a diffuser hole which has a shape whose cross-sectional hole area (area on a cross-sectional plane perpendicular to a central axis of the hole) is made larger toward its outlet end. Namely, it is preferable that the ejection hole 17 is a tapered hole gradually widened toward its outlet end.

As shown in FIG. 1, plural supplemental ejection holes 19 for ejecting the cooling air CA are formed on the leading edge 3e and the end face 3t of the rotor blade body 3, and communicate with the cooling channel 13. Plural eduction holes 21 for discharging the cooling air CA are formed on the trailing edge 3p of the rotor blade body 3, and communicate with the cooling channel 13.

Note that plural supplemental ejection holes 19 may be formed also on a suction surface 3b of the rotor blade body 3 in addition to the supplemental ejection holes 19 formed on the leading edge 3e and the end face 3t.

Next, advantages of the present embodiment will be explained.

When cooling air CA flows into the cooling channel 13 via the introduction channel 9 during operation of the gas turbine engine, the turbine rotor blade 1 is cooled from its inside by a convective cooling (an internal cooling). In addition, the cooling air CA after the convective cooling is ejected from the ejection holes 17 and the supplemental ejection holes 19 to form the cooling film CF (see FIG. 3(a)) surrounding the turbine rotor blade 1. The turbine rotor blade 1 is cooled from its outside by a film cooling (an external cooling) with the cooling film CF. Note that portion of the cooling air CA after the convective cooling for the turbine rotor blade 1 is ejected also from the eduction holes 21.

Since the downstream-side inner walls 15a of the bottomed recesses 15 are inclined and the central lines 17L of the ejection holes 17 extends along the downstream-side inner walls 15a, ejection angles of the cooling air CA from the ejection holes 15 can be made small without spoiling airfoil of the turbine rotor blade 1. As a result, Coanda effect by the cooling air CA can be obtained sufficiently.

In addition, since the downstream-side inner walls 15a of the bottomed recesses 15 are inclined, striking of portion of the combustion gas HG on the downstream-side inner walls 15a is mitigated and thereby separation of the combustion gas HG from the blade surface on a downstream side of the bottomed recess 15 can be reduced. Especially, as shown in FIG. 3(b), the separation of the combustion gas HG from the blade surface can be further reduced in a case where an upper edge of the downstream-side inner wall 15a is made as a smoothly curved surface.

Therefore, according to the present embodiment, cooling of the turbine rotor blade 1 is improved and aerodynamic loss of the turbine rotor blade 1 is reduced, so that reduction of engine efficiency of the gas turbine engine can be restricted sufficiently. Especially, as shown in FIGS. 4(a) and 4(b), when a shape of the ejection hole(s) 17 is made so as to widen its internal shape, attachablity of the cooling air CA to the pressure surface 3v is made higher and thereby cooling of the turbine rotor blade 1 can be improved further.

Second Embodiment

A second embodiment will be explained with reference to FIG. 5. Note that "D" in the drawings indicates a downstream direction of combustion gas, and "U" indicates an upstream direction.

A turbine rotor blade 23 in the present embodiment has almost the same configurations as those of the turbine rotor blade 1 in the above-explained first embodiment. Hereinafter, only configurations different from those of the turbine rotor blade 1 are explained, and configurations identical-to or similar-to those of the turbine rotor blade 1 are labeled with identical numerals and their explanations are omitted.

Figure 5:
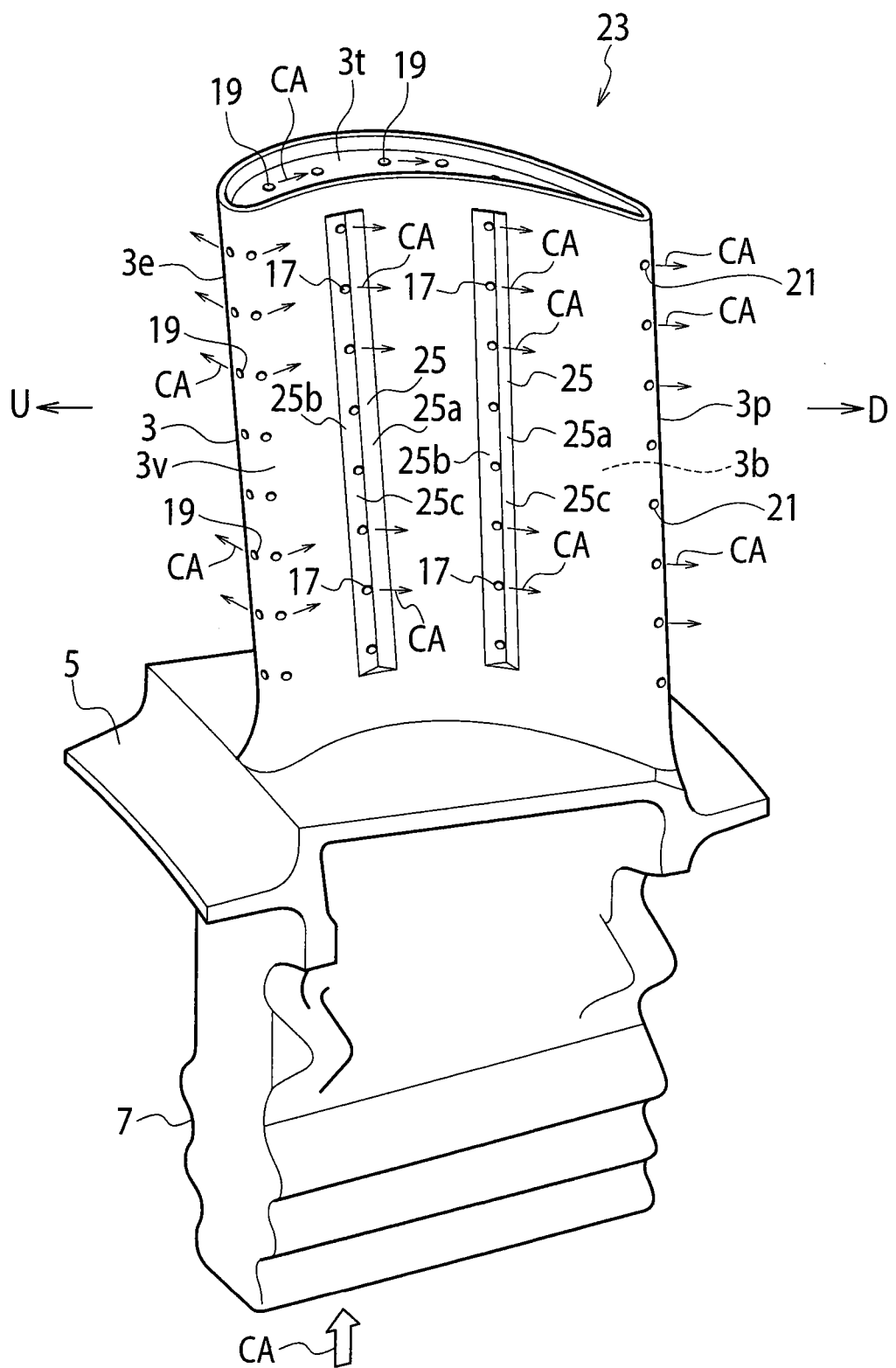
FIG. 5 is a perspective view of a turbine rotor blade according to a second embodiment.

As shown in FIG. 5, plural bottomed slots (one type of bottomed recess) 25 extending the span direction are formed on the pressure surface 3v of the rotor blade body 3. Similarly to the above-explained bottomed recesses 15, each downstream-side inner wall 25a of the bottomed slots 25 is inclined (inclined to the thickness direction T of the rotor blade body 3: inclined to the flow direction of the combustion gas: an angle between the downstream-side inner wall 25a and the pressure surface 3v is obtuse), and each upstream-side inner wall 25b of the bottomed slots 25 is also inclined symmetrically (inclined to the thickness direction T: inclined to the flow direction of the combustion gas: an angle between the upstream-side inner wall 25b and the pressure surface 3v is obtuse). The above-explained plural ejection holes 17 are formed on each bottom 25c (including a bottom-side of the upstream-side inner wall 25b) of the bottomed slots 25 at intervals along the span direction. Note that a cross-sectional shape of the bottomed slots 25 can be varied as explained in the first embodiment (see FIGS. 3(a) to 3(c)), and a shape of the ejection hole 17 can be also varied as explained in the first embodiment.

According to the present embodiment, in addition to the advantages by the first embodiment, the cooling air CA ejected from the plural ejection holes 17 can expand more easily along the span direction in each of the bottomed slots 25, so that the cooling film CF can be formed more extensively. As a result, cooling of the turbine rotor blade 1 can be improved further. Further, in the turbine rotor blade 23 in the present embodiment, the number of the bottomed slots (one type of bottomed recess) 25 can be reduced in comparison with the turbine rotor blade 1 in the first embodiment, so that manufacturing costs becomes lower.

Third Embodiment

A third embodiment will be explained with reference to FIGS. 6(a) and 6(b). Note that "D" in the drawings indicates a downstream direction of combustion gas, and "U" indicates an upstream direction.

A turbine rotor blade 27 in the present embodiment has almost the same configurations as those of the turbine rotor blade 1 in the above-explained first embodiment (or the turbine rotor blade 23 in the second embodiment). Hereinafter, only configurations different from those of the turbine rotor blade 1 are explained, and configurations identical-to or similar-to those of the turbine rotor blade 1 are labeled with identical numerals and their explanations are omitted.

Figure 6:
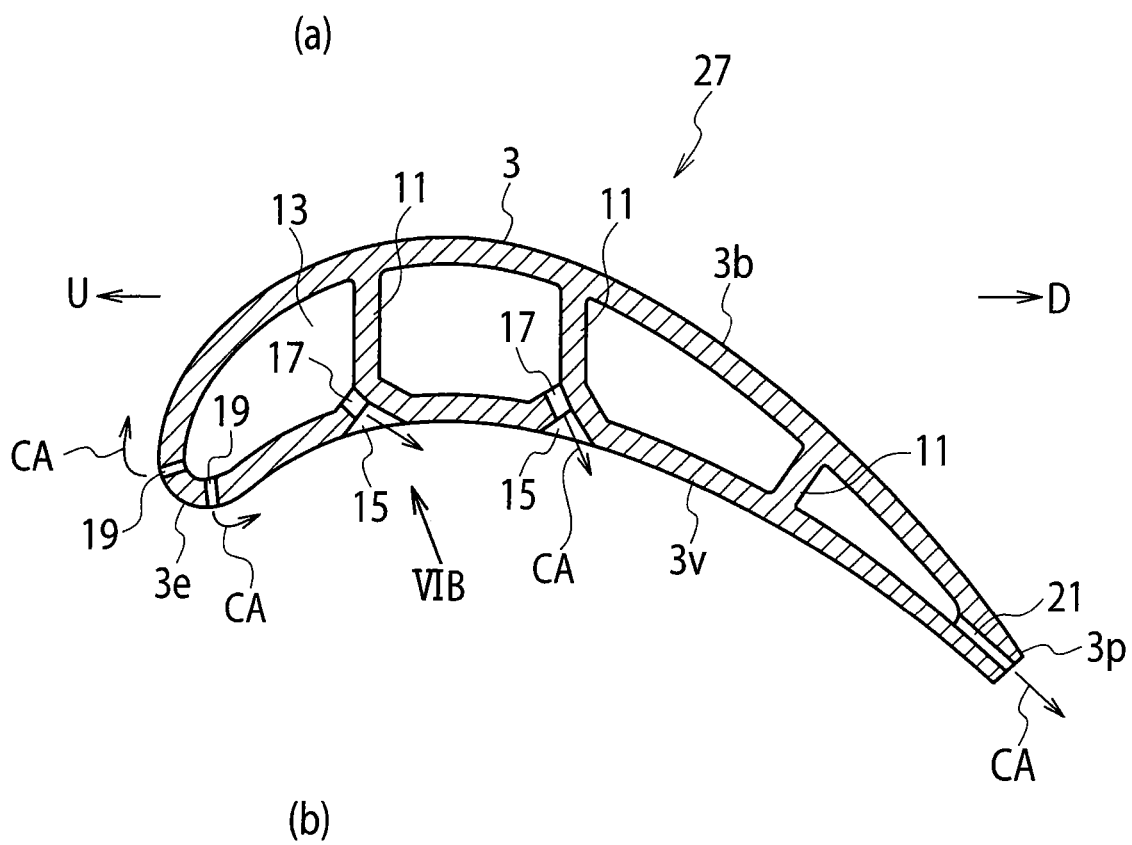
FIG. 6(a) is a lateral cross-sectional view of a turbine rotor blade according to a third embodiment along its chord direction.
FIG. 6(b) is an enlarged cross-sectional view of a portion indicated by an arrow VIB shown in FIG. 6(a).
Figure 6:
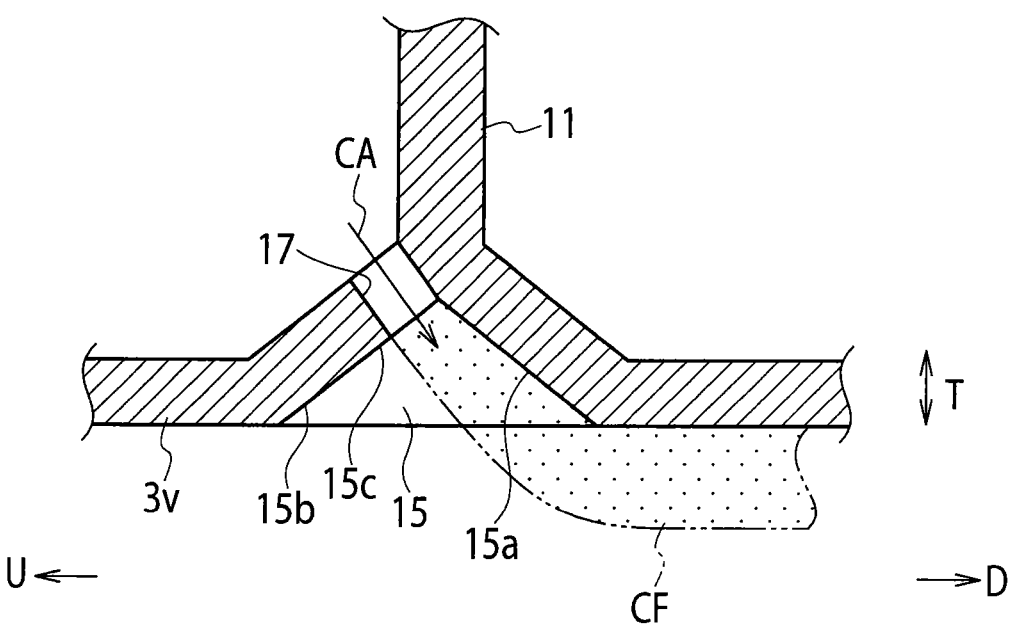

As shown in FIGS. 6(a) and 6(b), the bottomed recesses 15 explained in the first embodiment (or the bottomed slots 25 in the second embodiment) are formed, on the pressure surface 3v of the blade body 3, at positions associated with the partitions 11. In addition, the ejection holes 17 in the bottomed recesses 17 (the bottomed slots 25) are located just upstream of the partitions 11.

According to the present embodiment, in addition to the advantages by the first embodiment, affection to a shape of the cooling channel 13 can be reduced even when the plural bottomed recesses 15a are formed on the pressure surface 3v. More in detail, the bottomed recesses 15 protruding to the inside of the cooling channel 13 are not formed at a center of the channel, so that the flow of the cooling air CA in the cooling channel 13 becomes less impaired and manufacturing risks of the turbine blade by precision casting becomes low. In addition, since the bottomed recesses 15 (or the bottomed slots 25) are formed at the positions of the partitions 11, risks for reducing strength and stiffness of the blade body 3 becomes low. Further, the cooling air CA after the convective cooling is smoothly ejected out from the ejection holes 17 by being guided by the partitions 11.

Note that the present invention is not limited to the above embodiments, and, for example, the technical ideas applied to the turbine rotor blade 1 (23, 27) can be applied to engine components other than a turbine rotor blade, such as a turbine stator vane, a shroud, and a combustor liner.

The invention claimed is:

1. A turbine blade that is used in a turbine of a gas turbine engine and cooled by cooling air, the blade comprising:
   a cooling channel that is formed within the turbine blade and in which the cooling air flows;
   a plurality of bottomed recesses that is formed on a blade surface of the turbine blade and of which each downstream-side inner wall is inclined; and
   an ejection hole that is formed on each bottom of the plurality of bottomed recesses and communicates with the cooling channel to eject the cooling air, wherein
   the ejection hole is formed so that a central line of the ejection hole extends along the downstream-side inner wall,
   a partition extending in a span direction is formed in an inside of the turbine blade, and the cooling channel is partitioned by the partition, and
   at least one of the bottomed recesses is formed on the blade surface, at a position associated with the partition, and
   wherein the upstream-side inner wall of the bottomed recess is formed perpendicularly to the blade surface.

2. The turbine blade according to claim 1, wherein an inclined angle of the central line of the ejection hole to a plane parallel to the downstream-side inner wall of the bottomed recess is set within a range of ±20 degrees.

3. The turbine blade according to claim 1, wherein the ejection hole has a shape whose cross-sectional hole area is made larger toward an outlet end thereof.

4. The turbine blade according to claim 1, wherein at least one of the plurality of bottomed recesses is formed as a bottomed slot extending along a span direction, and a plurality of the ejection holes is formed at a bottom of the bottomed slot at intervals along the span direction.

5. The turbine blade according to claim 1, wherein each upstream-side inner wall of the bottomed recesses is inclined.

6. The turbine blade according to claim 5, wherein at least one of an upper edge of the downstream-side inner wall and an upper edge of the upstream-side inner wall of the bottomed recess is formed as a smoothly curved surface.

7. An engine component that is used in a gas turbine engine and cooled by cooling air, the component comprising:
   a cooling channel that is formed within the engine component and in which the cooling air flows;
   a plurality of bottomed recesses that is formed on a surface of the engine component and of which each downstream-side inner wall is inclined; and
   an ejection hole that is formed on each bottom of the plurality of bottomed recesses and communicates with the cooling channel to eject the cooling air, wherein
   the ejection hole is formed so that a central line of the ejection hole extends along the downstream-side inner wall,
   a partition extending in a span direction is formed in an inside of the turbine blade, and the cooling channel is partitioned by the partition, and
   at least one of the bottomed recesses is formed on the blade surface, at a position associated with the partition, and
   wherein the upstream-side inner wall of the bottomed recess is formed perpendicularly to the blade surface.

* * * * *